(12) United States Patent
Sato et al.

(10) Patent No.: US 6,939,386 B2
(45) Date of Patent: Sep. 6, 2005

(54) FILTER MEDIUM FOR AIR FILTER AND METHOD FOR ITS PRODUCTION

(75) Inventors: Masashi Sato, Nagaoka (JP); Toshihiko Soyama, Nagaoka (JP)

(73) Assignee: Hokuetsu Paper Mills, Ltd., Niigata (JP)

( * ) Notice: Subject to any disclaimer, the term of this patent is extended or adjusted under 35 U.S.C. 154(b) by 6 days.

(21) Appl. No.: 10/258,785

(22) PCT Filed: Jul. 11, 2001

(86) PCT No.: PCT/JP01/06009

§ 371 (c)(1),
(2), (4) Date: Oct. 28, 2002

(87) PCT Pub. No.: WO02/16005

PCT Pub. Date: Feb. 28, 2002

(65) Prior Publication Data

US 2003/0145569 A1 Aug. 7, 2003

(30) Foreign Application Priority Data

Aug. 21, 2000 (JP) ........................................ 2000-249531

(51) Int. Cl.$^7$ .............................................. B01D 39/20
(52) U.S. Cl. ...................... 55/524; 55/527; 55/DIG. 5; 428/436; 442/176; 442/180; 65/443; 65/447; 65/450
(58) Field of Search ...................... 55/524, 527, DIG. 5; 462/156, 164.1; 428/436; 442/58, 79, 176, 180; 65/443, 447, 450

(56) References Cited

U.S. PATENT DOCUMENTS 4,721,655 A * 1/1988 Trzasko et al. ............. 428/530
4,775,560 A * 10/1988 Katsura et al. ............. 428/34.2

FOREIGN PATENT DOCUMENTS

| JP | 47-43266 | B1 | 11/1972 | |
| JP | 04-210727 | | 7/1992 | |
| JP | 6-30868 | * | 2/1994 | ........... B01D/39/18 |
| JP | 06-131993 | | 6/1994 | |
| JP | 08-034962 | | 2/1996 | |
| JP | 9-225226 | * | 9/1997 | ........... B01D/39/06 |

* cited by examiner

*Primary Examiner*—Duane Smith
*Assistant Examiner*—Jason M. Greene
(74) *Attorney, Agent, or Firm*—Hedman & Costigan, P.C.

(57) ABSTRACT

A filter medium for an air filter, characterized in that it comprises a filter material having a glass fiber as its primary component and an alkyl ketene dimer adhered to the surface of the glass fiber; and a method for producing the filter medium which comprises a step of subjecting a dispersed slurry of a raw material fiber to a wet papermaking to form a wet paper, a step of immersing the wet paper in an aqueous dispersion or solution of the dimer or a liquid mixture of the dimer and a binder resin, or applying or spraying any of the above-mentioned liquids to the wet paper, to thereby allow the dimer to adhere onto the surface of the glass fiber, and a step of drying the resultant wet paper having the dimer adhered thereto. The filter medium exhibits a reduced amount of an out gas generated when it is used with ventilation and also exhibits high water-repellency and satisfactory strength in various applications such as air conditioning of a building and semiconductor manufacturing.

4 Claims, No Drawings

FILTER MEDIUM FOR AIR FILTER AND METHOD FOR ITS PRODUCTION

TECHNICAL FIELD

The present invention is related to a filter medium for an air filter, and in particular to a filter medium for an air filter used in clean rooms related to semiconductor, liquid crystal and bio/food industries, clean benches and the like, or an air filter used in building air conditioning, air cleaners and the like.

PRIOR ART TECHNOLOGY

The filter medium for an air filter used in clean rooms of the semiconductor industries and the like is provided with water repellency as a normal requirement. In this regard, the water repellency in the present invention is prescribed by the measurement method MIL-STD-282.

The object of providing water repellency to the filter medium refers to the act of preventing permeation of the sealing compound or hot melt or the like used at the time when the filter medium is added to the air filter unit, the act of making it possible to use the filter medium without alteration even in the case were the surface of the filter medium comes into contact with water or there is water condensation due to temperature changes or the like. Further, in an environment where there exist many grains of sea salt, a filter medium having high water repellency is required in order to prevent deliquescence of the collected salt component.

In the MIL standard, the water repellency of a HEPA filter medium is prescribed as being above 508 mm $H_2O$. However, there is no reason for all HEPA filter mediums to conform to this standard, and appropriate water repellency is established depending on the conditions of use thereof. Further, even though water repellency is not prescribed expressly for an ASHRAE filter medium used in a primary filter or for building ventilation, it goes without saying that there are cases where water repellency is required for the reasons described above.

As for prior art methods of providing water repellency to the filter medium of an air filter, which makes glass fibers the primary fibers, methods which use silicone resin (Japanese Laid-Open Patent Publication No. HEI-2-175997) or which use both fluororesin and silicone resin (Japanese Laid-Open Patent Publication No. HEI-2-41499) or the like have been proposed.

On the other hand, with the improvements in the integration level of LSI in the semiconductor manufacturing process of recent years, trace quantities of odor gas components (hereafter referred to as outgassing) in $ng/m^3$ generated from the air filter and the other structural members forming the clean room bond to the semiconductor wafer and become a cause of degrading of the remaining steps of the semiconductor product, and this has become a big problem. In this regard, the outgassing components that cause problems are generally polar substances which easily bond to the silicon wafer, and of these, in particular, low-molecular cyclic siloxanes, phthalic acid ester compounds used in plasticizers and the like, phosphoric ester compounds used in flame retardants and the like, phenol compounds used in antioxidants and the like, and the like are recognized as causing problems.

Incidentally, water repellants formed by silicone resin or water repellants formed by fluororesin include many of the above-described problem components which are derived from the low molecular weight components of the unreacted substances, reaction byproducts, additives and the like at the time of manufacturing, and because these are outgassed from the filter medium when it is used for ventilation, there has been a demand for an improvement.

A method (WO97/04851) which uses a non-silicone paraffin wax water repellant has been proposed as a means for solving this problem, but paraffin wax is a substance having very strong hydrophobic properties, and in the case where paraffin wax is bonded to a filter medium formed by wet-laid process using hydrophilic glass fibers, it is difficult to distribute the paraffin wax uniformly on the filter medium, and a considerably large amount is needed to provide water repellency. Further, in this regard, in the case where a large amount of a water repellant is used for the purpose of improving water repellency, there arise problems such as the lowering of the strength of the filter medium due to interference of the glass fiber bonds of the binder resin. Furthermore, because hydrocarbons are outgassed even in a paraffin wax water repellant, although it can be said that the bonding rate to the silicon wafer is low compared with the problem components described above, because any bonding will degrade the remaining steps of the semiconductor product, there has been a demand to lower such amount of bonding.

SUMMARY OF THE INVENTION

In order to provide a filter medium having high water repellency which makes it possible to prevent the sealing compound or hot melt or the like from permeating to the filter medium, which makes it possible to use the filter medium without alteration even in the case were the surface of the filter medium comes into contact with water or there is water condensation due to temperature changes or the like, and which makes it possible to prevent deliquescence of a collected salt component in an environment where there exist many grains of sea salt, and in order to provide a filter medium having sufficient strength in which the amount of outgassing is small when used for ventilation, the present inventors diligently carried out research which resulted in the discovery that, when compared to prior art products, a very distinctive filter medium for an air filter can be obtained by bonding an alkyl ketene dimer to the surfaces of glass fibers in a filter medium having the glass fibers as primary fibers, whereby the present invention is achieved.

It is an object of the present invention to provide a filter medium for an air filter which generates only a small amount of outgassing when used for ventilation, and which has high water repellency and sufficient strength regardless of applications to building air-conditioning, semiconductor industries and the like by bonding an alkyl ketene dimer to the surfaces of glass fibers in a filter medium having the glass fibers as primary fibers.

Further, it is an object of the present invention to provide a filter medium for an air filter, which lowers the amount of outgassing even more by further restricting the type of alkyl ketene dimer.

Furthermore, it is an object of the present invention to provide a rational method of manufacturing the filter medium for an air filter described above.

The solution means for solving the objects stated above are as follows bellow. Namely, the invention comprises a filter medium for an air filter, which includes glass fibers that form the primary fibers of the filter medium, and an alkyl ketene dimer, which is bonded to the surfaces of said glass fibers.

The invention also comprises the filter medium for an air filter as described herein wherein said alkyl ketene dimer is given by Structural Formula 1, where $R_m$ is $C_mH_{2m+1}$ ($m \geq 14$), and $R_n$ is $C_{2n+1}$ ($n \geq 14$).

Structural Formula 1

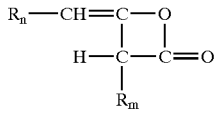

The invention additionally provides a method of manufacturing a filter medium for an air filter, and includes the step of forming wet web by carrying out wet-laid process on slurry in which raw fibers comprised primarily of glass fibers are dispersed; the step of bonding an alkyl ketene dimer to the surfaces of said glass fibers by dipping said wet web in an aqueous solution having the alkyl ketene dimer dispersed therein or a liquid mixture of the alkyl ketene dimer and a binder resin, or by applying or spraying the aqueous solution having the alkyl ketene dimer dispersed therein or the liquid mixture of the alkyl ketene dimer and the binder resin onto said wet web; and the step of drying the wet web having the alkyl ketene dimer bonded to the surfaces of said glass fibers.

In accordance with the invention described herein, because the high modular weight alkyl ketene dimer used as a water repellant has almost no volatility, it is possible to provide a filter medium for an air filter in which the amount of outgassing is very small at the time of ventilation. Further by using an alkyl ketene dimer, which has good dispersibility, it is possible to provide high water repellency that is the same as or higher than that of silicone resin or fluororesin even when the added amount is small.

In accordance with the invention described herein, it is possible to provide a filter medium for an air filter in which the amount of outgassing is especially low.

In accordance with the invention described herein, because it is possible to bond the alkyl ketene dimer uniformly to the surfaces of the glass fibers, it is possible to provide a method of manufacturing a filter medium for an air filter which has high water repellency that is the same as or higher than that of silicone resin or fluororesin by the addition of a small amount of an alkyl ketene dimer, and which has sufficient strength.

PREFERRED EMBODIMENTS OF THE INVENTION

The glass fibers used as primary fibers in the present invention can be chosen freely from chopped-strand glass fibers or glass microfibers having various fiber diameters and fiber lengths according to the required filtration performance and other physical properties. Further, low-boron glass fibers and silica glass fibers can be used for the purpose of preventing contamination of the semiconductor process. Furthermore, natural fibers and organic synthetic fibers and the like may be dispersed as secondary material among the glass fibers without causing interference.

The alkyl ketene dimer used in the present invention is widely used as a size agent for preventing ink permeation in paper having wood pulp as the primary fiber, for example, using palmitic acid having a carbon number 16 or stearic acid having a carbon number 18 as a raw material, these fatty acids are reacted via an acid chloride to form an alkyl ketene dimer which is a dimer represented by Structural Formula 2.

Structural Formula 2

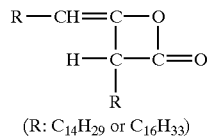

(R: $C_{14}H_{29}$ or $C_{16}H_{33}$)

Structural Formula 4

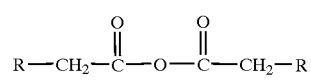

(R: $C_{14}H_{29}$ or $C_{16}H_{33}$)

The molecular weight of the alkyl ketene dimer obtained in this way is at least 476 or higher, and the acid anhydride represented by Structural Formula 3 existing several % as a byproduct has a molecular weight of 494 or higher. Because both of these components have a high molecular weight, the possibility of them being outgassed is very low.

Further, the alkyl ketene dimer according to the present invention also includes the structures where the group R shown in Structural Formula 2 is $C_{18}H_{37}$ or $C_{20}H_{41}$. Furthermore, the byproducts in this case are structures where R in Structural Formula 3 is $C_{18}H_{37}$ or $C_{20}H_{41}$.

The alkyl ketene dimer according to the present invention can be represented as a general formula using Structural Formula 4.

Structural Formula 4

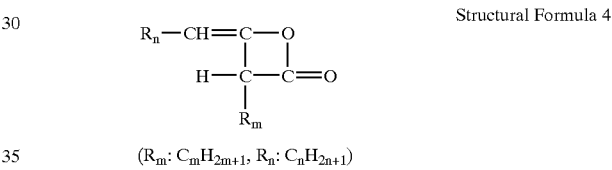

($R_m$: $C_mH_{2m+1}$, $R_n$: $C_nH_{2n+1}$)

The alkyl ketene dimer illustrated using Structural Formula 2 can be said to be the case where m, n=14 or 16 in Structural Formula 4, and the alkyl ketene dimer having the structure in which the group R shown in Structural Formula 2 is $C_{18}H_{37}$ or $C_{20}H_{41}$ can be said to be the case where m, n=18 or 20 in Structural Formula 4.

The alkyl ketene dimer according to the present invention also includes the case where m and n are any positive integers. However, both m and n are preferably positive integers of 14 or higher. This is because an alkyl ketene dimer having $R_m$ and $R_n$ with both m and n being 14 or higher has a large molecular weight, whereby it is possible to further lower the amount of outgassing. On the other hand, there is no particular restriction on the upper limit of m and n. However, from the viewpoint of the cost of making the alkyl ketene dimer, m and n should realistically be 22 or lower. Of course, when m and n are made larger than 22, the molecular weight becomes even larger, whereby it is possible to further lower the amount of outgassing.

As for the mechanism by which the alkyl ketene dimer imparts a size effect, it is thought that the alkyl ketene dimer is fixed by a reaction in which covalent bonds are formed with the hydroxyl groups of cellulose, which is made of pulp fibers. However, in the case where an alkyl ketene dimer is applied to glass fibers, it is thought that it is difficult for covalent bonding reactions to occur on the glass surface. Instead, in this case, because the alkyl ketene dimer has considerable hydrophilic properties compared with the case of normal hydrophobic substances, it is possible to distribute the alkyl ketene dimer uniformly without cohesion with the surfaces of the hydrophilic glass fibers that have undergone wet-laid process, and for this reason, it is thought that an alkyl ketene dimer makes it possible to provide high water repellency even when a small amount is added.

In the prior art, there are almost no examples of an alkyl ketene dimer being used except for the purpose of imparting size properties to paper, but by using the adsorption mechanism of the alkyl ketene dimer and glass fibers, it is possible to provide high water repellency to a glass fiber filter medium. Until now, in order to provide high water repellency to a glass fiber medium, silicone resin and fluororesin have been used widely because of the high water repellency resulting from the chemical structures of these resins, but in the present invention, by uniformly distributing an alkyl ketene dimer on the surfaces of the base material even for hydrocarbons, it is possible to provide water repellency that is the same as or higher than that of silicone resin or fluororesin.

Next, the method of manufacturing the filter medium for an air filter of the present invention will be described. First, the process of making wet web will be described. Dispersing raw fibers, which are primarily glass fibers in water using a pulper or the like, makes slurry. In this regard, in order to improve the dispersibility of the glass fibers, preferably sulfuric acid or hydrochloric acid is added to adjust the pH in the range 2~4, or a dispersant is added under neutral conditions. This slurry undergoes a papermaking process in a papermaking machine to form wet web.

Next, the process of bonding an alkyl ketene dimer to the surfaces of the glass fibers will be described. As for the method of providing the alkyl ketene dimer and a binder resin, it is possible to use a method in which they are added to the slurry in advance, or a method in which the alkyl ketene dimer and the binder resin are added after the wet web is formed and before drying or after drying, but the method of bonding after the wet web is formed is preferred in order to reduce the used amounts and efficiently impart water repellency and strength. As for the most preferred method, it is possible to use a method in which the wet web is dipped in a liquid mixture of the alkyl ketene dimer and the binder resin, or a method in which the liquid mixture is applied or sprayed onto the wet web. When these are provided, there is a method in which the alkyl ketene dimer and the binder resin are provided by separate processes, or a method in which the alkyl ketene dimer and the binder resin are mixed and provided at the same time, but it makes no difference which method is used.

As for the binder resin that is provided together with the alkyl ketene dimer to impart strength, it is possible to use acrylic resin, vinyl acetate resin, epoxy resin, urethane resin or the like.

The proportion of the alkyl ketene dimer with respect to the binder resin inside the paper preferably has a solid portion weight ratio of 100/1~100/30. When the amount of alkyl ketene dimer with respect to the binder resin is less than 100/1, sufficient strength can not be obtained, and when the ratio is greater than 100/30, there is interference with the bonding of the fibers by the binder resin, and this lowers the strength.

Further, even in the case where the filter medium is formed by bonding only the alkyl ketene dimer to the surfaces of the glass fibers without adding a binder resin, the filter medium can endure use so long as there isn't a particular need for filter medium strength. At this time, as for the method of providing only the alkyl ketene dimer, it is possible to use a method in which the dimer is added to the slurry in advance, or a method in which the alkyl ketene dimer is bonded after the wet web is formed and before drying or after drying in the same manner as described above. The method of bonding after the wet web is formed is preferred in order to reduce the used amount and efficiently impart water repellency. As for the most preferred method, it is possible to use a method in which the wet web is dipped in a liquid aqueous dispersion, or a method in which the dispersion is applied or sprayed onto the wet web.

Next, the process of drying the wet web will be described. After completing the process described above, the sheet is dried using a hot air dryer or a rotary dryer or the like to obtain a filter medium. In this regard, in order to impart sufficient water repellency, the drying temperature is preferably 110° C. or higher.

EXAMPLE EMBODIMENTS

The present invention will be described in greater detail using example embodiments and comparative examples, but the present invention is in no way limited by such examples.

Example Embodiment 1

60% by weight of glass microfibers having an average fiber diameter of 0.65 $\mu$m, 35% by weight of very fine glass fibers having an average fiber diameter of 2.70 $\mu$m, and 5% by weight of chopped glass fibers having an average fiber diameter of 6 $\mu$m were macerated by a pulper and sulfuric acid having a 0.5% concentration and an acidity pH 2.5. Next, a papermaking process was carried out using a handsheet machine to obtain wet web. Next, a binder liquid composed of acrylic latex (trade name: Voncoat AN-155, Manufacturer: Dainippon Ink and Chemicals, Inc.) with an alkyl ketene dimer (trade name: AS263, Manufacturer: Japan PMC Corporation, m, n=14 or 16 in Structural Formula 4) mixed in to form a solid portion weight ratio of 100/10 was applied to the wet web, and then drying was carried out by a dryer at 130° C. to obtain a HEPA filter medium having a basis weight of 70 g/m$^2$ and a binder composition solid portion bonded quantity of 5.5% by weight.

Example Embodiment 2

25% by weight of glass microfibers having an average fiber diameter of 0.65 $\mu$m, 55% by weight of very fine glass fibers having an average fiber diameter of 2.70 $\mu$m, and 20% by weight of chopped-strand glass fibers having an average fiber diameter of 6 $\mu$m were subjected to a papermaking process in the same manner as that of Example Embodiment 1, and the same binder liquid as that of Example Embodiment 1 was applied and drying was carried out in the same manner to obtain ASHRAE filter medium having a basis weight of 70 g/m$^2$ and a binder composition solid portion bonded quantity of 5.3% by weight.

Example Embodiment 3

A binder liquid composed of acrylic latex (trade name: Voncoat AN-155, Manufacturer: Dainippon Ink and Chemicals, Inc.) with a high molecular weight type alkyl ketene dimer (synthetic product, Manufacturer: Japan PMC Corporation, m, n=18 or 20 in Structural Formula 4) mixed in to form a solid portion weight ratio of 100/10 was used, and the other processes were carried out in the same manner as that of Example Embodiment 1 to obtain a HEPA filter medium having a basis weight of 70 g/m$^2$ and a binder composition solid portion bonded quantity of 5.6% by weight.

Example Embodiment 4

Except for providing a binder liquid having the same composition as that of Example Embodiment 3, the other processes were carried out in the same manner as that of Example Embodiment 2 to obtain ASHRAE filter medium having a basis weight of 70 g/m² and a binder composition solid portion bonded quantity of 5.4% by weight.

Comparative Example 1

A binder liquid composed of acrylic latex (trade name: Voncoat AN-155, Manufacturer: Dainippon Ink and Chemicals, Inc.) with a paraffin wax type water repellant (trade name: Petrox P-200, Manufacturer: Meisei Chemical Industry, Inc.) mixed in to form a solid portion weight ratio of 100/10 was used, and the other processes were carried out in the same manner as that of Example Embodiment 1 to obtain a HEPA filter medium having a basis weight of 70 g/m² and a binder composition solid portion bonded quantity of 5.5% by weight.

Comparative Example 2

A binder liquid composed of acrylic latex (trade name: Voncoat AN-155, Manufacturer: Dainippon Ink and Chemicals, Inc.) with a paraffin wax type water repellant (trade name: Petrox P-200, Manufacturer: Meisei Chemical Industry, Inc.) mixed in to form a solid portion weight ratio of 100/50 was used, and the other processes were carried out in the same manner as that of Example Embodiment 1 to obtain a HEPA filter medium having a basis weight of 70 g/m² and a binder composition solid portion bonded quantity of 5.6% by weight.

Comparative Example 3

A binder liquid composed of acrylic latex (trade name: Voncoat AN-155, Manufacturer: Dainippon Ink and Chemicals, Inc.) with a silicone type water repellant (trade name: SM7025, Manufacturer: Toray Dow Corning Silicone Co., Ltd.) mixed in to form a solid portion weight ratio of 100/10 was used, and the other processes were carried out in the same manner as that of Example Embodiment 1 to obtain a HEPA filter medium having a basis weight of 70 g/m² and a binder composition solid portion bonded quantity of 5.4% by weight.

Comparative Example 4

A binder liquid composed of acrylic latex (trade name: Voncoat AN-155, Manufacturer: Dainippon Ink and Chemicals, Inc.) with a fluorine type water repellant (trade name: Light-guard FRG-1, Manufacturer: Kyoueisha Chemicals, Inc.) mixed in to form a solid portion weight ratio of 100/10 was used, and the other processes were carried out in the same manner as that of Example Embodiment 1 to obtain a HEPA filter medium having a basis weight of 70 g/m² and a binder composition solid portion bonded quantity of 5.5% by weight.

Comparative Example 5

A binder liquid composed of acrylic latex (trade name: Voncoat AN-155, Manufacturer: Dainippon Ink and Chemicals, Inc.) with a paraffin wax type water repellant (trade name: Petrox P-200, Manufacturer: Meisei Chemical Industry, Inc.) mixed in to form a solid portion weight ratio of 100/10 was used, and the other processes were carried out in the same manner as that of Example Embodiment 2 to obtain ASHRAE filter medium having a basis weight of 70 g/m² and a binder composition solid portion bonded quantity of 5.5% by weight.

The analysis of the example embodiments and the comparative examples were carried out by the following method.

Water repellency was measured in accordance with MIL-STD-282.

Tensile strength was measured in accordance with JIS P8113.

Ply bond strength was measured in accordance with J. TAPPI Paper Pulp Test Method No. 18.

Pressure drop was measured using a manometer to measure the difference in pressure at the time a flow was passed at a face velocity of 5.3 cm/second through a filter medium having an effective surface area of 100 cm².

DOP efficiency was measured using a laser particle counter at the time air containing a large dispersion of DOP particles generated with a Raskin nozzle was passed at a surface flow rate of 5.3 cm/second through a filter medium having an effective surface area of 100 cm². The target particle diameter was 0.3~0.4 µm.

The amount of outgassing was measured by GC-MS after approximately 1 g of a sample was heated at 80° C. for 1 hour inside an air flow of an inert gas, and the outgassing from the sample was collected and concentrated by an adsorbent. The amount of outgassing at this time was evaluated relatively by a toluene analytical curve.

The evaluation results of the HEPA filter mediums of Example Embodiment 1, Example Embodiment 3 and Comparative Examples 1~4 are shown in Table 1.

Blank Space Below

TABLE 1

| Water Repellant | Example Embodiment 1 Alkyl Ketene Dimer (m, n = 14 or 16 in structural Formula 4) | Example Embodiment 3 Alkyl Ketene Dimer (m, n = 18 or 20 in structural Formula 4) | Comparative Example 1 Paraffin Wax | Comparative Example 2 Paraffin Wax | Comparative Example 3 Silicone Resin | Comparative Example 4 Fluororesin |
|---|---|---|---|---|---|---|
| Acrylic/Water Repellant Solid Portion Weight Ratio | 100/10 | 100/10 | 100/10 | 100/50 | 100/10 | 100/10 |
| Water Repellency (mm in water) | 700 | 670 | 70 | 520 | 540 | 620 |
| Tensile Strength (kN/m) | 1.00 | 0.94 | 0.88 | 0.60 | 0.82 | 0.90 |
| Ply Bond Strength (kPa) | 22.6 | 22.5 | 20.4 | 9.6 | 17.2 | 18.8 |

TABLE 1-continued

| Water Repellant | Example Embodiment 1 Alkyl Ketene Dimer (m, n = 14 or 16 in structural Formula 4) | Example Embodiment 3 Alkyl Ketene Dimer (m, n = 18 or 20 in structural Formula 4) | Comparative Example 1 Paraffin Wax | Comparative Example 2 Paraffin Wax | Comparative Example 3 Silicone Resin | Comparative Example 4 Fluororesin |
|---|---|---|---|---|---|---|
| Pressure Drop (Pa) | 280 | 272 | 276 | 278 | 279 | 278 |
| 0.3~0.4 μm DOP Efficiency (%) | 99.9936 | 99.9927 | 99.9934 | 99.9958 | 99.9948 | 99.9952 |
| Amount of Total Outgassing (ng/g) | 600 | 270 | 1800 | 8400 | 20200 | 28000 |

In Comparative Example 1 in which a paraffin wax type water repellant was added, the water repellency is very low compared to Example Embodiment 1 and Example Embodiment 3 in which an alkyl ketene dimer was added despite the fact that the used amount of water repellant is the same.

In Comparative Example 2, which had five times the added amount of the paraffin wax type water repellant, water repellency, which fell short of that, achieved by Example Embodiment 1 and Example Embodiment 3 was observed. However, because the binder effect of the acrylic latex was hindered, there was a large drop in the ply bond strength. When this kind of drop in strength properties occurs, this becomes a cause of the occurrence of tearing at the time of ventilation or splitting at the time of pleating. Further, because the added amount is increased, the amount of outgassing from the paraffin wax also increases.

In Comparative Example 3 in which a silicone type water repellant was added, and in Comparative Example 4 in which a fluorine type water repellant was added, sufficient filter performance could be obtained for the physical surfaces in both filter mediums, but the amount of outgassing from the water repellant was very large, and in clean room applications of semiconductor processes, there is the possibility that this will form a cause of degrading of the remaining steps of the product.

In Example Embodiments 1 and 3, the water repellency was high, the tensile strength and the ply bond strength were strong, and the filter properties had a good performance as shown by the pressure drop and the DOP efficiency. Further, the amount of outgassing was low when compared to each comparative example. In particular, in Example Embodiment 3, which used a high molecular weight type alkyl ketene dimer (m, n=18 or 20 in Structural Formula 4), the amount of outgassing was very low.

The evaluation results of the ASHRAE filter mediums of Example Embodiment 2, Example Embodiment 4 and Comparative Example 5 are shown in Table 2.

Blank Space Below

TABLE 2

| Water Repellant | Example Embodiment 2 Alkyl Ketene Dimer (m, n = 14 or 16 in structural Formula 4) | Example Embodiment 4 Alkyl Ketene Dimer (m, n = 18 or 20 in structural Formula 4) | Comparative Example 5 Paraffin Wax |
|---|---|---|---|
| Acrylic/Water Repellant Solid Portion Weight Ratio | 100/10 | 100/10 | 100/10 |
| Water Repellency (mm in water) | 580 | 560 | 40 |
| Tensile Strength (kN/m) | 0.88 | 0.93 | 0.80 |
| Ply Bond Strength (kPa) | 15.2 | 14.9 | 14.0 |
| Pressure Drop (Pa) | 83.0 | 82.3 | 82.2 |
| 0.3~0.4 μm DOP Efficiency (%) | 94.32 | 94.38 | 94.50 |
| Amount of Total Outgassing (ng/g) | 620 | 250 | 1600 |

The results for the ASHRAE filter mediums were the same as that of the case of the HEPA filter mediums, and in Example Embodiments 2 and 4 in which an alkyl ketene dimer was added, the water repellency was very high when compared to Comparative Example 5 in which a paraffin wax type water repellant was added. Further, in Example Embodiments 2 and 4, the tensile strength and the ply bond strength were strong, and the filter properties had a good performance as shown by the pressure drop and the DOP efficiency. Further, the amount of outgassing was low when compared to Comparative Example 5. In particular, in Example Embodiment 4, which used a high molecular weight type alkyl ketene dimer (m, n=18 or 20 in Structural Formula 4), the amount of outgassing was very low.

We claim:

1. A filter medium for an air filter, comprising:
   glass fibers which form the primary fibers of the filter medium; and
   an alkyl ketene dimer which is bonded to the surfaces of said glass fibers in order to reduce the outgassing derived from low molecular weight components selected from the group consisting of unreacted substances, reaction by products and additives.

2. The filter medium for an air filter, described in claim 1, further comprising a binder resin for bonding the glass fibers wherein the alkyl ketene dimer is bonded to the surfaces of said glass fibers so that the solid portion weight ration of the alkyl ketene dimer with respect to said binder resin (binder resin/alkyl ketene dimer) is 100/1~100/30.

3. The filter medium for an air filter, described in claim 1 or 2, wherein said alkyl ketene dimer is given by Structural Formula 1, where $R_m$ is $C_mH_{2m+1}(m \geq 14)$, and $R_n$ is $C_nH_{2n+1}(n \geq 14)$.

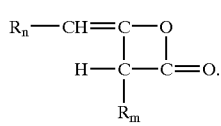

Structural Formula 1

4. A method of manufacturing a filter medium for an air filter which is capable of reducing the outgassing, comprising:

the step of forming a wet web by carrying out a wet-laid process on slurry in which raw fibers comprised primarily of glass fibers are dispersed;

the step of bonding an alkyl ketene dimer to the surfaces of said glass fibers by dipping said wet web in an aqueous solution having the alkyl ketene dimer dispersed therein or a liquid mixture of the alkyl ketene dimer and a binder resin in which the solid portion weight ratio of the alkyl ketene dimer with respect to said binder resin (binder resin/alkyl ketene dimer) is 100/1~100/30, or by applying or spraying the aqueous solution having the alkyl ketene dimer dispersed therein or the liquid mixture of the alkyl ketene dimer and the binder resin in which the solid portion weight ratio of the alkyl ketene dimer with respect to said binder resin (binder resin/alkyl ketene dimer) is 100/1~100/30 onto said wet web; and the step of drying the wet web having the alkyl ketene dimer bonded to the surfaces of said glass fibers.

* * * * *